United States Patent
Piccolotto et al.

(10) Patent No.: US 9,921,631 B2
(45) Date of Patent: Mar. 20, 2018

(54) METHODS AND APPARATUS FOR SAVING POWER

(75) Inventors: Jose Piccolotto, Cordoba (AR); German Lancioni, Cordoba (AR)

(73) Assignee: INTEL CORPORATION, Santa Clara, CA (US)

( * ) Notice: Subject to any disclaimer, the term of this patent is extended or adjusted under 35 U.S.C. 154(b) by 220 days.

(21) Appl. No.: 13/977,667

(22) PCT Filed: Mar. 25, 2012

(86) PCT No.: PCT/US2012/030493
§ 371 (c)(1), (2), (4) Date: Jun. 28, 2013

(87) PCT Pub. No.: WO2013/147729
PCT Pub. Date: Oct. 3, 2013

(65) Prior Publication Data
US 2014/0208145 A1 Jul. 24, 2014

(51) Int. Cl.
*G06F 1/00* (2006.01)
*G06F 1/32* (2006.01)
*G09G 3/20* (2006.01)

(52) U.S. Cl.
CPC .............. *G06F 1/32* (2013.01); *G06F 1/3231* (2013.01); *G06F 1/3265* (2013.01); *G09G 3/20* (2013.01); *G09G 2330/022* (2013.01); *G09G 2330/027* (2013.01); *Y02B 60/1242* (2013.01); *Y02B 60/1289* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 5,958,055 A * | 9/1999 | Evoy et al. .................. 713/310 |
| 6,526,159 B1 | 2/2003 | Nickerson | |
| 6,665,805 B1 * | 12/2003 | Tsirkel et al. ................ 713/323 |
| 7,430,675 B2 * | 9/2008 | Lee ............................. 713/320 |
| 9,613,193 B1 * | 4/2017 | Harter ..................... G06F 21/31 |
| 9,700,240 B2 * | 7/2017 | Letchner ............... A61B 5/1118 |
| 2004/0073827 A1 | 4/2004 | Tsirkel et al. | |

(Continued)

FOREIGN PATENT DOCUMENTS

| JP | 11-242733 A | 9/1999 |
|---|---|---|
| JP | 2011-087168 A | 4/2011 |

(Continued)

OTHER PUBLICATIONS

International Preliminary Report on Patentability received for PCT Patent Application No. PCT/US2012/030493, dated Oct. 9, 2014, 6 pages.

(Continued)

*Primary Examiner* — Mohammed Rehman (57) ABSTRACT

In one example embodiment, a device uses a camera and an eye detection service to determine whether a user is looking at a display of the device during periods when the user is not actively interacting with the device. In response to a determination that the user is not looking at the display, the display is automatically powered off. In response to the user's resumption of looking at the display, the display may be automatically powered back on. Other embodiments are described and claimed.

29 Claims, 3 Drawing Sheets

(56) References Cited

U.S. PATENT DOCUMENTS

| | | | |
|---|---|---|---|
| 2004/0175020 A1 | 9/2004 | Bradski et al. | |
| 2009/0066165 A1* | 3/2009 | Luo | H03K 17/00 |
| | | | 307/115 |
| 2009/0082066 A1 | 3/2009 | Katz | |
| 2010/0245330 A1 | 9/2010 | Mertens | |
| 2013/0069897 A1* | 3/2013 | Liu | G06F 3/0488 |
| | | | 345/173 |
| 2014/0282877 A1* | 9/2014 | Mahaffey | H04L 63/0853 |
| | | | 726/3 |
| 2015/0149968 A1* | 5/2015 | Sun | G06F 3/04883 |
| | | | 715/863 |
| 2015/0379963 A1* | 12/2015 | Holmanu | G09G 5/12 |
| | | | 345/173 |

FOREIGN PATENT DOCUMENTS

| | | |
|---|---|---|
| WO | 2009/040614 A1 | 4/2009 |
| WO | 2013/147729 A1 | 10/2013 |

OTHER PUBLICATIONS

Office Action Received for Korean Patent Application No. 10-2013-7020677 dated Aug. 28, 2014, 6 pages of Office Action and 4 pages of English Translation.

Internatonal Search Report and Written opinion Received for PCT Application No. PCT/US2012/030493, dated Nov. 23, 2012, 9 pages.

Moshnyaga, Vasily G.,"A Camera-Based Energy Management of Computer Displays and TV sets", Energy Technology and Management, Fukuoka University, Oct. 3, 2011, pp. 137-157.

\* cited by examiner

METHODS AND APPARATUS FOR SAVING POWER

TECHNICAL FIELD

The present disclosure relates in general to data processing systems. More particularly, the present disclosure relates to saving power in a data processing system.

BACKGROUND ART

For purposes of this disclosure, the noun "display" refers to the hardware component that a data processing system uses to present visual information to a person (the "user"). When a conventional data processing system is turned on ("powered on"), the display is powered on regardless of whether the user is actively interacting with the data processing system. The power, or energy, used by the display when powered on may be wasted in scenarios where the user does not require that the display be powered on. For instance, the user may leave the area where the data processing system is located and the display may remain powered on unless the user specifically instructs the data processing system to power off the display. For purposes of this disclosure, the term "power off" denotes turning off the power.

Saving power has become more desirable with the advent of mobile data processing systems, such as smartphones, laptops, and other devices that may rely on battery power. A user may conserve power by disabling specific features, such as a module that searches for wireless connections; components that enable various communication channels, such as the protocol known by the trademark BLUETOOTH and so-called third generation (3G), fourth generation (4G), or other high-speed internet connections; vibrating alerts; multiple email accounts; options to perform automatic email or web browser updates; etc. A user may turn the entire device off when not in use, or if available, switch into a mode where signal transmitting functions are suspended ("airplane mode" or "offline mode"). A user may terminate applications that are potentially running in the background or avoid applications that require high amounts of power, such as games or music applications. A user may also save power being used only by the display by reducing the brightness of the display, setting a time out feature to a low value to cause the device to power off the display quickly after the user has stopped providing user input, avoiding screensavers, or manually powering off the display.

Power-saving solutions may also be implemented by developers. For instance, a developer may create a software application that powers off the display when certain activities occur, such as answering a phone call on a smartphone. A developer may also create technology that reduces the amount of power used by a display. For example, some liquid crystal displays (LCDs) use the display processing technology marketed under the trademark PIXCALE to reduce power consumption. A company called Unipixel has also suggested some display technology that allegedly uses less power than conventional displays. However, if a user is intermittently interacting with a device, power may still be lost when the display remains powered on despite the lack of need for a powered on display.

BRIEF DESCRIPTION OF THE DRAWINGS

Features and advantages of the present invention will become apparent from the appended claims, the following detailed description of one or more example embodiments, and the corresponding figures, in which:

DESCRIPTION OF THE EMBODIMENTS

Powering off a display is beneficial for saving energy and may extend the battery life of a device. When a user is interacting with a device, such as a mobile smartphone, the display may be, by default, powered on. When the user ceases to interact with the device in such a way that requires the display to be powered on, unless the user or a software application specifically instructs that the display should be power off, the display may remain on for a predetermined amount of time of inactivity. Allowing the display to remain powered on when not required reduces power efficiency and may reduce the battery life of a device.

According to the present disclosure, in at least one embodiment, a power-saving eye detection service uses a camera to detect whether a user is looking at the display during times of inactivity to determine whether the display should remain powered on. If the user is not looking at the display, the eye detection service instructs the display to power off, thereby saving power and potentially extending the battery life of the device.

Figure 1:
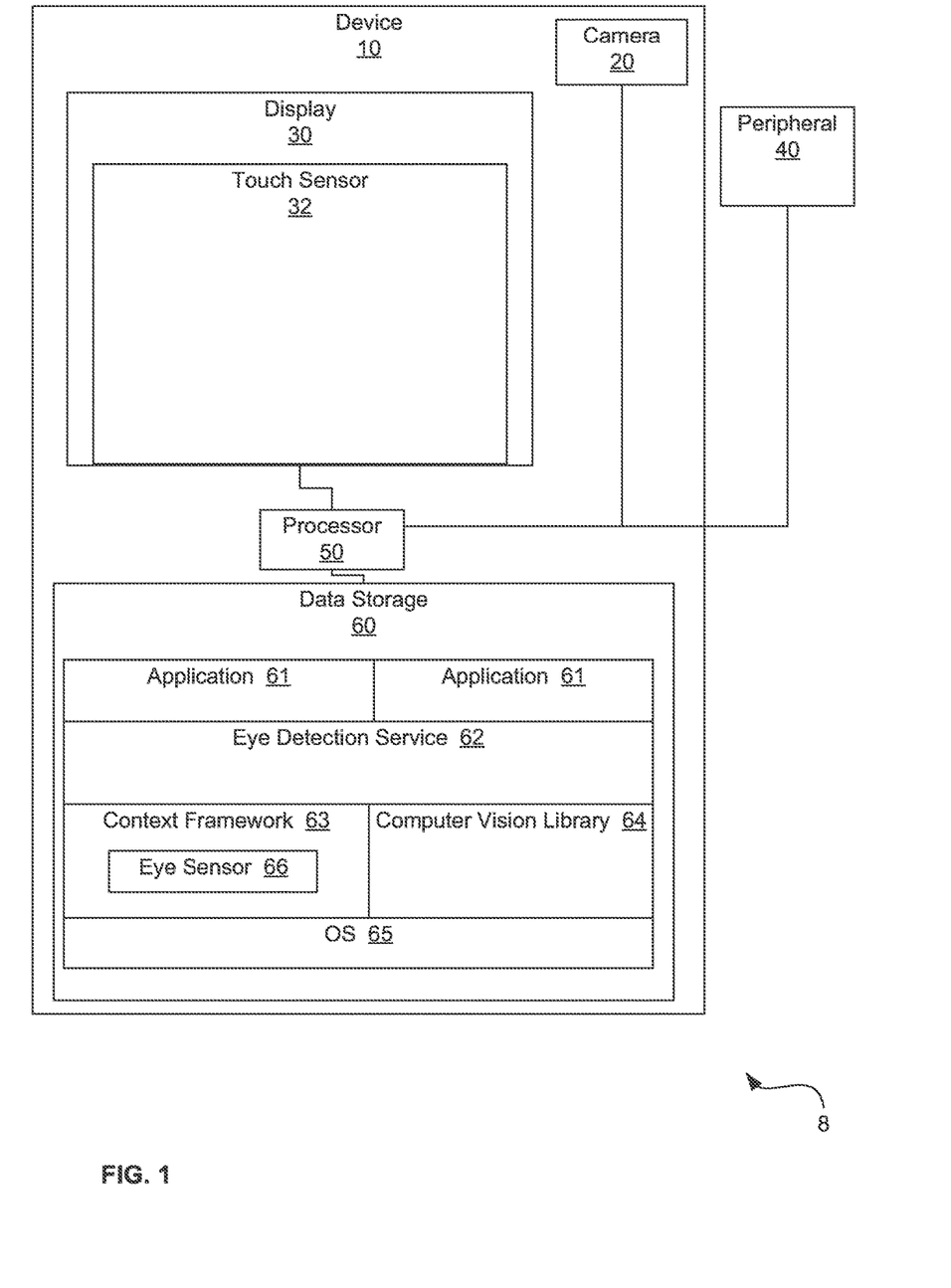
FIG. 1 is a block diagram of a data processing system with a power-saving eye detection service according to at least one example embodiment.

FIG. 1 is a block diagram of data processing system 8 with an eye detection service 62, according to one example embodiment. In the illustrated embodiment, the data processing system is a device 10 with at least one central processing unit (CPU) or processor 50, as well as data storage 60 and a display 30 responsive to the processor. The display may include a touch sensor 32 that covers some or all of the display surface. The touch sensor may serve as an input interface. As indicated below, the device may also include other input devices. In the illustrated embodiment, the eye detection service is implemented as software that is stored in the data storage and executed by the processor to provide the functionality described below. An OS 65, a context framework 63, a computer vision library 64, and one or more applications 61 are also stored in the data storage, and when those components execute on the processor, they may invoke the eye detection service. The context framework may include an eye sensor 66. The processor may also be connected to a camera 20 and to one or more peripherals 40 (e.g., a keyboard or a mouse).

In the embodiment of FIG. 1, the context framework may describe a framework that enables the development of context-aware applications. For instance, a device with a context framework may be able to use Intel® Context Aware Computing technology to determine a user's individual needs and personalize a user's experience with applications and services. Additional details on Intel®'s Context Aware Computing technology can be found at http://techresearch.intel.com/ResearchAreaDetails.aspx?Id=37.

FIG. 1 also refers to a computer vision library housed within the data storage. This may refer to an Open Computer Vision (OpenCV) library containing programming functions aimed at real time computer vision. Computer vision (CV)

describes the methods for acquiring, processing, analyzing, and understanding images in order to produce numerical or symbolic information. For instance, a computer may be able to capture images of a person in real time and be able to determine whether there is a human eye within the images and also whether that eye is moving. More information on the OpenCV library can be found at http://opencv.willowgarage.com/wiki/. As described in greater detail below with respect to FIG. 2, the eye detection service may use information obtained from the CV library to determine whether the user is looking at the display. For purposes of this disclosure, the information that is reported by the CV library may be referred to as "vision results."

In one embodiment, the eye detection service may be implemented as an OS service. In another embodiment, the eye detection service may be a background application. The eye detection service may interact with the context framework. For instance, when a user is not actively touching a user interface of the device, as described below, the eye detection service may connect to the context framework in order to detect whether the user is looking at the display. The context framework may load an eye sensor. The eye sensor may power on a camera and use vision results from the CV library to determine whether the user is looking at the display, and the eye sensor may generate eye sensory data indicating whether the user is looking at the display, based on the vision results from the CV library. The eye detection service may then receive the eye sensory data from the eye sensor. The eye sensory data may be in a simple format, such as "<LookingAtScreen>false</LookingAtScreen>". In response to the eye sensory data, the eye detection service may power off the display if it is determined that the user is not looking at the display. If it is determined that the user is looking at the display, the eye detection service may leave the display powered on. If the user actively touches a user interface of the device while the eye detection service is determining whether the user is looking at the display, the eye detection service may receive touch sensory data indicating active touching and suspend itself.

Various different programming languages or combinations of programming languages and such may be used to implement the eye detection service, the context framework, and the CV library in various different environments. For instance, a combination of C and C++ may be used, as well as Java or JavaScript. Implementation details may also vary for implementations designed for different platforms or devices, such as devices which use the Android OS, devices which use the iPhone OS, devices which use the Windows CE OS, etc.

Figure 2:
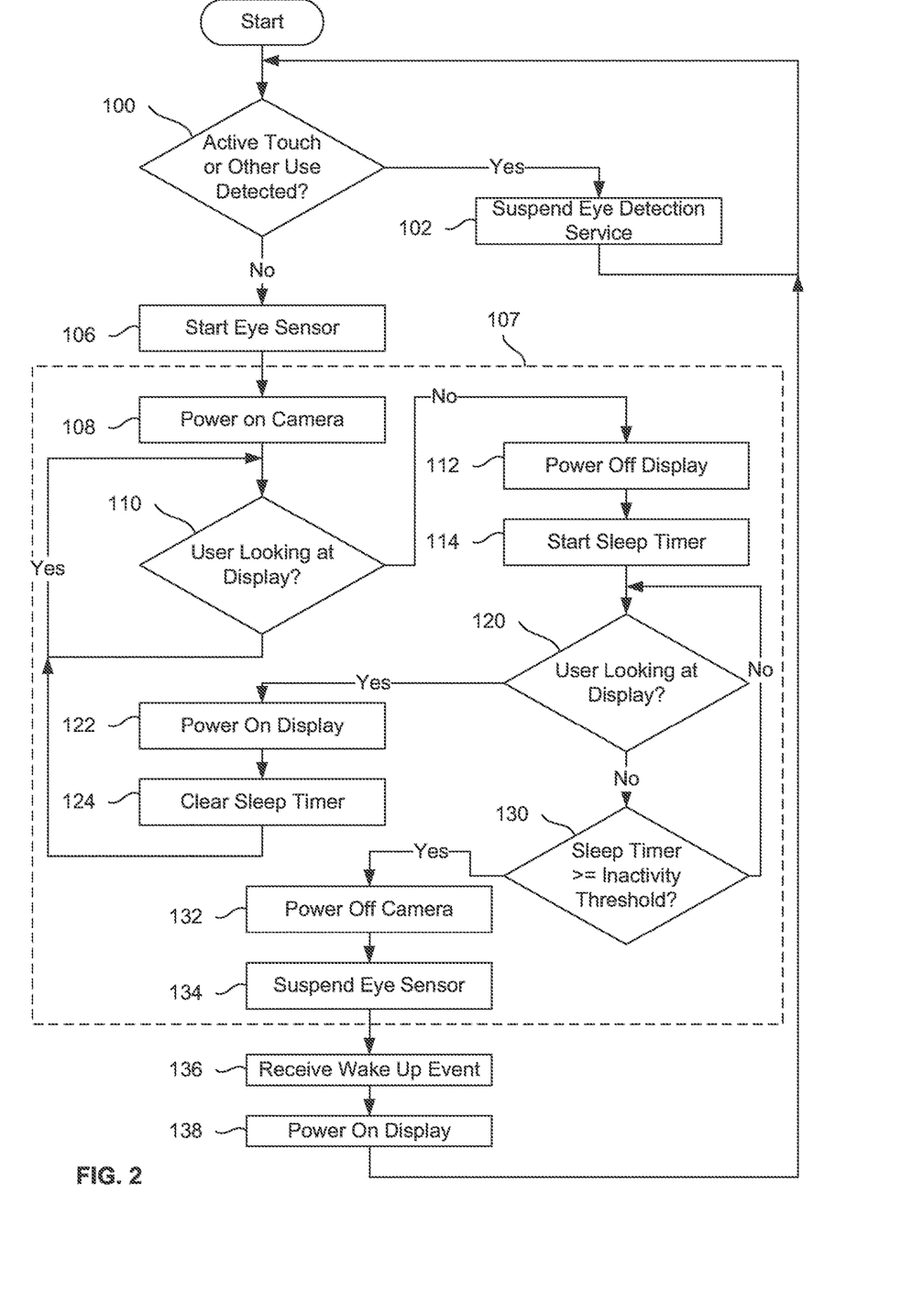
FIG. 2 presents a flowchart of a process for powering off a display when a user is not looking at the display or actively using the device according to at least one example embodiment.

FIG. 2 presents a flowchart of a process for powering off a display when a user is not looking at the display or actively using the device according to at least one example embodiment. The illustrated process may involve a device like that of FIG. 1, and the process may begin with the display powered on. As shown at block 100, the eye detection service determines whether the user is actively using or interacting with the device, either through actively touching a user interface of the device or another use indicating active interaction or use. The device may be configured to interpret various types of activities as indications that the user is actively interacting with a device. For instance, if the device is a smartphone, the display may have a touch sensor incorporated into the display. The touch sensor may be able to distinguish between active touching, such as entering data into an input interface (e.g., an on-screen keyboard), and inactive touching, such as the user's cheek touching the screen when using the smartphone to talk on the phone. If the device detects only inactive touching, the device may determine that the user is not actively using or interacting with the device. In addition, the device may be used in other ways to indicate active interaction. In one or more embodiments, the types of activities that the device may interpret as active interaction may include, without limitation, typing on a peripheral keyboard, moving a mouse, providing audio input via a microphone, providing input via a game controller, and displaying a presentation or video on a second display or projector.

If the eye detection service receives touch sensory data or other data indicating active interaction, the eye detection service may suspend itself, as shown at block 102, in that the eye detection service does not continuously monitor eyes but simply waits for inactivity. If there is no active interaction, the context framework loads an eye sensor that powers on the camera, as shown at blocks 106 and 108. Consequently, as indicated by dashed box 107, the eye detection service is no longer suspended but connects to the context framework to retrieve eye sensory data from the eye sensor and provides power management operations for the display, as indicated below. As depicted in block 110, after the camera is powered on, the eye detection service determines whether the user is looking at the display. For instance, as indicated above, the eye detection service may use eye sensory data from the eye sensor to determine whether the user is looking at the display. In one embodiment, when the eye sensor detects a face in front of the camera (based on vision results from the CV library), the eye sensor filters at least one of the eyes as points. Then the eye sensor returns corresponding eye sensory data to the caller, the eye detection service.

In one embodiment, the eye detection service is configured to determine that the user is looking at the display in response to receiving eye sensory data indicating detection of a face pointed towards the display. Alternatively, the eye detection service may be configured to determine that the user is looking at the display in response to receiving eye sensory data indicating detection of at least one eye in view of the camera. Alternatively, the eye detection service may determine that the user is looking at the display in response to eye sensory data indicating detection of a pair of eyes on a face in view of the camera. In another embodiment, the eye detection service may interpret eye sensory data resulting from certain combinations of vision results as indicating that the user is looking at the display. For instance, in some situations (e.g., when the display has been powered off and then the user returns to the computer), face detection alone without indication of which direction the face is pointing may result in a determination that the user is looking at the display. The eye detection service may also be configured to determine that the user is looking at the display in response to eye sensory data indicating that an eye has been detected, even if a face has not been detected (to provide for the possibility that face recognition may have failed, due to the angle of the user's face, for instance).

In response to a determination that the user is looking at the display, the eye detection service may keep the display powered on, as indicated by the "Yes" arrow of block 110. In response to a determination that the user is not looking at the display, the eye detection service may automatically power off the display, as shown at block 112. As shown at block 114, the eye detection service may then also start a sleep timer. While the sleep timer is running, the eye detection service may continue to operate in order to determine whether the user has returned his or her gaze to the display, as shown in block 120. If the user resumes looking at the display before a predetermined inactivity threshold is reached, the eye detection service may automatically power the display back on, as depicted in block 122. In one embodiment, the eye detection service causes the display to power off within one second after detecting that the user is not looking at the display, and the eye detection service causes the display to power on within one second after detecting that the user has resumed looking at the display. In other embodiments, the eye detection service may implement other response times for powering off the display, including, without limitation, power-off time periods less than or equal to 2000 milliseconds or greater than or equal to 300 milliseconds. In one embodiment, the user may configure the power-off time period to a value greater than or equal to the minimum time. Similarly, in some embodiments, the eye detection service may implement power-on time periods less than or equal to 800 milliseconds or greater than or equal to 100 milliseconds. In one embodiment, the user may configure the power-on time period to a value greater than or equal to the minimum time. Also, different embodiments may use different combinations of power-off time periods and power-on time periods, including, without limitation, any combination of the power-off and power-on time periods described above.

If the eye detection service powers on the display again, the eye detection service may also clear the sleep timer, as shown in block 124. The eye detection service may then continue to operate in order to determine whether the user continues to look at the display, as indicated by the arrow returning to block 110 from block 124.

However, referring again to block 120, if the user is not looking at the display after the sleep timer has been started, the eye detection service may determine whether the sleep timer equals or exceeds a predetermined inactivity threshold, as show at block 130. Consequently, if the user does not look at the display for a period of time that is greater than or equal to the predetermined inactivity threshold, as measured by the sleep timer, the eye detection service may then power off the camera to further reduce power consumption of the device, as shown in block 132. The eye detection service may then suspend itself, as shown in block 134.

Subsequently, as shown at block 136, the OS may receive a wake-up event, for instance in response to user interaction with a mouse or a keyboard. In response to the wake-up event, the OS may power on the display, as depicted in block 138. Wake-up events may be the same as or similar to those that wake a device from "sleep mode," and in one embodiment, the types of activities that would constitute a wake-up event may be set by the user. The process may then return to block 100, with the device determining whether the user is actively interacting with the device or looking at the display, and responding accordingly, as described above. Thus, the eye detection service is active (not suspended) for the operations shown within dashed box 107.

In another embodiment, an application may override the eye detection service if the application requires that the display remain in a specific state of being powered on or off. For instance, a video player may permanently suspend the eye detection service during the course of a video being played to avoid the display being powered off at an inopportune time. Similarly, a service that is downloading a file may automatically power on the display in response to completion of the download. In addition, these and other kinds of power on and power off operations may be controlled by settings that may be modified by an application, a user, an administrator, etc.

Figure 3A:
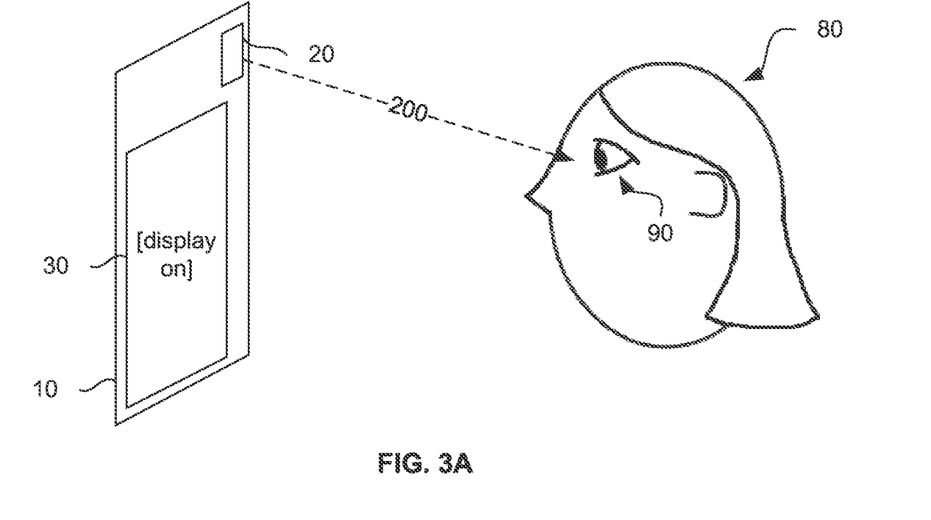
FIGS. 3A and 3B are schematic diagrams depicting the use of a camera to detect whether a user is looking at a display according to at least one example embodiment.
Figure 3B:
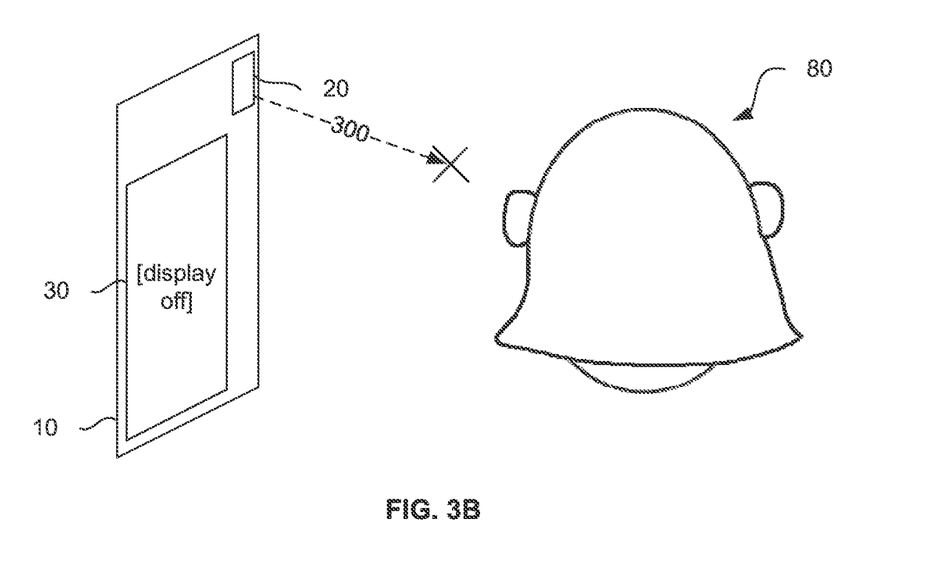

FIGS. 3A and 3B depict the use of a camera to detect whether a user is looking at a display according to at least one example embodiment. In the illustrated embodiment, the eye detection service 62 in the device 10 of FIG. 1 may utilize the camera 20 to determine whether the user 80 is looking at the display 30. As shown in FIG. 3A, dotted line 200 indicates that the eye detection service is able to determine that the user is looking at the display, based on vision results such as those described above. For example, the eye detection service may determine that the user is looking at the display based on vision results from the CV library indicating that the user's face has been detected within view of the camera and pointed towards the display. The eye detection service may also determine that the user is looking at the display based on vision results indicating that the CV library has detected at least one eye 90 within view of the camera. In response to determining that the user is looking at the display, the eye detection service may power on the display, as indicated above.

In contrast, as shown in FIG. 3B, dotted line 300 indicates that the eye detection service is unable to detect a user looking at the display. For instance, as indicated above, the eye detection service may determine that no user is looking at the display after receiving eye sensory data indicating that the CV library has been unable to detect the presence of a human face or a human eye in a human face in view of the camera. In response to determining that no user is looking at the display, the eye detection service may power off the display, as indicated above.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Also, components that are described as being coupled to each other, in communication with each other, as being responsive to each other, or the like, need not be in continuous communication with each other or directly coupled to each other, unless expressly specified otherwise. In addition, some components of the data processing system may be implemented as adapter cards with interfaces (e.g., a connector) for communicating with a bus. Alternatively, devices may be implemented as embedded controllers, using components such as programmable or non-programmable logic devices or arrays, application-specific integrated circuits (ASICs), embedded computers, smart cards, and the like.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, flash memory, etc. Alternatively, some or all of the control logic for implementing the described operations may be implemented in hardware logic (e.g., as part of an integrated circuit chip, a programmable gate array (PGA), an ASIC, etc.). Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

Embodiments may include, without limitation, some or all of the features described in the following paragraphs.

A method for controlling a display of a data processing system may comprise the operation of using a camera of the data processing system to automatically determine whether a user of the data processing system is watching a display of the data processing system. In response to a determination that the user is not watching the display, the display may be automatically powered off.

A method for controlling a display of a data processing system may comprise automatically determining whether a user is actively using the data processing system before using a camera to automatically determine whether the user is watching the display. In response to a determination that the user is not actively using the data processing system, the camera may be automatically powered on.

A method for determining whether a user is actively using a data processing system may comprise determining whether the user is actively touching an input interface. The input interface may comprise a touch sensor incorporated into the display of the data processing system.

A method for controlling a display of a data processing system may comprise using a camera of the data processing system to automatically determine whether a user resumes watching the display after the display has been automatically powered off. In response to a determination that the user has resumed watching the display, the display may be automatically powered on.

A method for controlling a display of a data processing system may comprise determining whether a user is watching the display by detecting the presence of the user's face within view of a camera of the data processing system. Determining whether the user is watching the display may comprise determining the direction the user's face is pointed. In response a determination that the user's face is pointed at the display, it may be determined that the user is watching the display.

A method for controlling a display of a data processing system may comprise determining whether a user is watching the display by detecting the presence of at least on, eye of the user within view of a camera of the data processing system. In response to detection of at least one eye of the user within view of the camera, it may be determined that the user is watching the display.

A method for controlling a display of a data processing system may comprise determining whether a user has not actively used the data processing system for at least a predetermined period of time after the display has been automatically powered off. In response to a determination that the user has not actively used the data processing system for at least the predetermined period of time, a camera of the data processing system may be automatically powered off. After the display has been automatically powered off in response to a determination that the user has not actively used the data processing system for at least the predetermined period of time, it may be automatically determined whether the user is actively using the data processing system. In response to a determination that the user is actively using the data processing system, the display may be automatically powered on.

At least one non-transitory machine accessible medium may comprise instructions which, when executed by a data processing system, enable a data processing system to perform the methods for controlling a display of the data processing system, as described above.

A data processing system may comprise a processor, at least one non-transitory machine accessible medium responsive to the processor, and instructions in the machine accessible medium which, when executed by the data processing system, enable the data processing system to perform the methods for controlling a display of the data processing system, as described above.

What is claimed is:

1. One or more non-transitory machine accessible media storing instructions, which, when executed by a data processing system, cause the data processing system to:
   receive an indication of touch sensor input of the data processing system;
   determine whether the touch sensor input corresponds to an inactive touch;
   determine cessation of user interaction with the data processing system based on a determination that the touch sensor input corresponds to the inactive touch;
   power up a camera of the data processing system in response to the determined cessation of user interaction with the data processing system;
   control a display of the data processing system based on one or more images captured by the camera, controlling the display including sending a control signal to power off the display;
   determine, after powering off the display, that a user is not looking at the display for at least a predetermined period of time; and
   send a control signal to power off the camera based on a determination that the user is not looking at the display for at least the predetermined amount of time.

2. The one or more non-transitory machine accessible media of claim 1, the instructions, which, when executed by the data processing system, cause the data processing system to:
   determine that a user is not looking at the display based on the one or more images captured by the camera; and
   send a control signal to power off the display based on a determination that the user is not looking at the display.

3. The one or more non-transitory machine accessible media of claim 2, the instructions, which, when executed by the data processing system, cause the data processing system to:
   detecting, after powering off the display, user interaction with the data processing system; and
   sending, in response to detecting user interaction with the data processing system, a control signal to power on the display.

4. The one or more non-transitory machine accessible media of claim 2, wherein the determining that the user is not looking at the display comprises determining whether there is at least one eye in view of the camera based at least in part on the one or more images captured by the camera.

5. The one or more non-transitory machine accessible media of claim 2, wherein the determining that the user is not looking at the display comprises determining whether there is a pair of eyes in view of the camera based at least in part on the one or more images captured by the camera.

6. The one or more non-transitory machine accessible media of claim 2, wherein the determining that the user is not looking at the display comprises determining whether a face is in view of the camera based at least in part on the one or more images captured by the camera.

7. The one or more non-transitory machine accessible media of claim 2, wherein the determining that the user is not looking at the display comprises determining whether a face in view of the camera is pointed toward the display, based at least in part on the one or more images captured by the camera.

8. The one or more non-transitory machine accessible media of claim 1, wherein the determining cessation of user interaction with the data processing system comprises determining cessation of touch sensor input of the data processing system.

9. The one or more non-transitory machine accessible media of claim 1, wherein the determining cessation of user interaction with the data processing system comprises determining cessation of input at a data processing system peripheral.

10. The one or more non-transitory machine accessible media of claim 1, wherein the determining cessation of user interaction with the data processing system comprises determining cessation of audio input to the data processing system.

11. The one or more non-transitory machine accessible media of claim 1, wherein the determining cessation of user interaction with the data processing system comprises determining cessation of the delivery of content to be displayed by or at a device external to the data processing system.

12. The one or more non-transitory machine accessible media of claim 1, wherein the determining cessation of user interaction with the data processing system comprises determining cessation of movement of the data processing system.

13. A method for saving power, the method comprising:
   receiving an indication of touch sensor input of a data processing system;
   determining whether the touch sensor input corresponds to an inactive touch;
   determining cessation of user interaction with the data processing system based on a determination that the touch sensor input corresponds to the inactive touch;
   powering up a camera of the data processing system in response to the determined cessation of user interaction with the data processing system;
   controlling a display of the data processing system based on one or more images captured by the camera, controlling the display including sending a control signal to power off the display;
   determining, after powering off the display, that a user is not looking at the display for at least a predetermined period of time; and
   sending a control signal to power off the camera based on a determination that the user is not looking at the display for at least the predetermined amount of time.

14. The method of claim 13, wherein the controlling the display of the data processing system comprises:
   determining that a user is not looking at the display based on the one or more images captured by the camera; and
   sending a control signal to power off the display based on a determination that the user in not looking at the display.

15. The method of claim 13, wherein the determining cessation of user interaction with the data processing system comprises determining cessation of input at a data processing system peripheral.

16. The method of claim 13, wherein the determining cessation of user interaction with the data processing system comprises determining cessation of audio input to the data processing system.

17. The method of claim 13, wherein the determining cessation of user interaction with the data processing system comprises determining cessation of movement of the data processing system.

18. A data processing system comprising:
   a camera;
   a display;
   one or more processors;
   at least one machine readable media encoding instructions, which, when executed by the one or more processors, cause the one or more processors to:
      receive an indication of touch sensor input of the data processing system;
      determine whether the touch sensor input corresponds to an inactive touch;
      determine cessation of user interaction with the data processing system based on a determination that the touch sensor input corresponds to an inactive touch;
      send a control signal to power up the camera of the data processing system in response to the determined cessation of user interaction with the data processing system;
      control the display of the data processing system based on one or more images captured by the camera, controlling the display including sending a control signal to power off the display;
      determine, after powering off the display, that a user is not looking at the display for at least a predetermined period of time; and
      send a control signal to power off the camera based on a determination that the user is not looking at the display for at least the predetermined amount of time.

19. The data processing system of claim 18, the instructions, which, when executed by the one or more processors, cause the one or more processors to:
  determine that a user is not looking at the display based on images captured by the camera; and
  send a control signal to power off the display based on a determination that the user is not looking at the display.

20. The data processing system of claim 19, the instructions, which, when executed by the one or more processors, cause the one or more processors to:
  detect after powering off the display, user interaction with the data processing system; and
  sending a control signal to power off the display in response to detecting user interaction with the data processing system.

21. The data processing system of claim 19, wherein the determining that the user is not looking at the display comprises determining whether there is at least one eye in view of the camera based at least in part on the one or more images captured by the camera.

22. The data processing system of claim 19, wherein the determining that the user is not looking at the display comprises determining whether there is a pair of eyes in view of the camera based at least in part on the one or more images captured by the camera.

23. The data processing system of claim 19, wherein the determining that the user is not looking at the display comprises determining whether a face is in view of the camera based at least in part on the one or more images captured by the camera.

24. The data processing system of claim 18, wherein the determining that the user is not looking at the display comprises determining whether a face in view of the camera is pointed toward the display, based at least in part on the one or more images captured by the camera.

25. The data processing system of claim 18, wherein the determining cessation of user interaction with the data processing system comprises determining cessation of touch sensor input of the data processing system.

26. The data processing system of claim 18, wherein the determining cessation of user interaction with the data processing system comprises determining cessation of input at a data processing system peripheral.

27. The data processing system of claim 18, wherein the determining cessation of user interaction with the data processing system comprises determining cessation of audio input to the data processing system.

28. The data processing system of claim 18, wherein the determining cessation of user interaction with the data processing system comprises determining cessation of the delivery of content to be displayed by or at a device external to the data processing system.

29. The data processing system of claim 18, wherein the cessation of user interaction with the data processing system comprises determining cessation of movement of the data processing system.

* * * * *